Jan. 8, 1952     A. M. ROCKWELL     2,581,886
AUTOMATICALLY VARIABLE SPEED SCAVENGE PUMP DRIVE
Filed Feb. 4, 1947
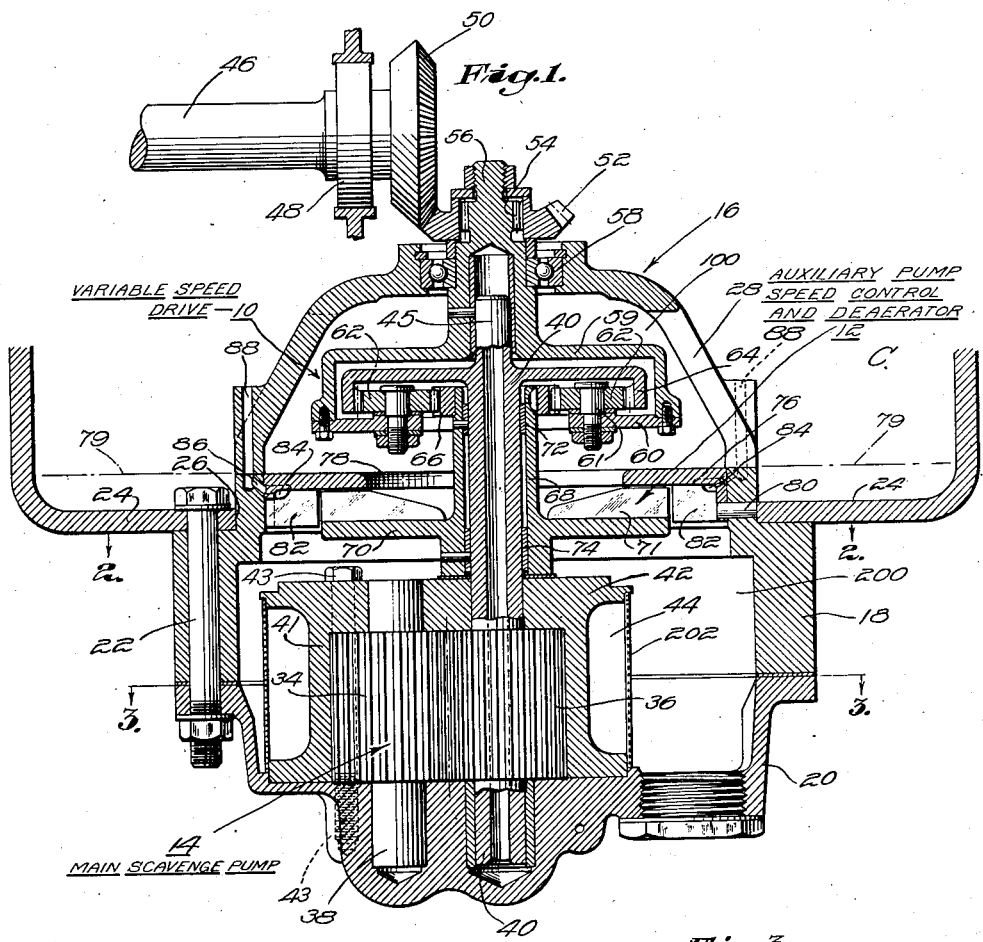
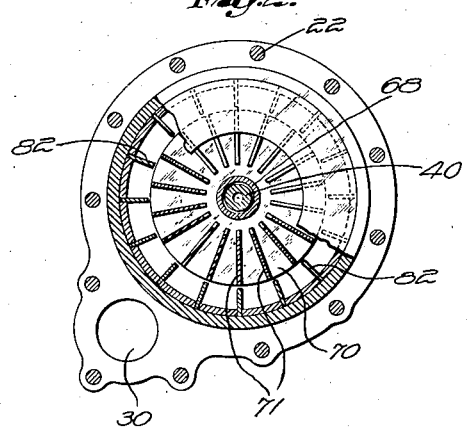
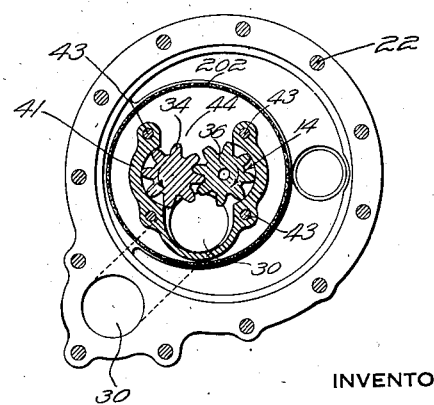
INVENTOR
Albert M. Rockwell
BY
Attorney Patented Jan. 8, 1952

2,581,886

UNITED STATES PATENT OFFICE 2,581,886

AUTOMATICALLY VARIABLE SPEED SCAVENGE PUMP DRIVE

Albert M. Rockwell, Glastonbury, Conn., assignor to United Aircraft Corporation, East Hartford, Conn., a corporation of Delaware Application February 4, 1947, Serial No. 726,314

9 Claims. (Cl. 103—23)

This invention relates to a pumping apparatus which is particularly adapted for scavenging oil in aircraft engines.

An object of this invention is to provide a novel and improved scavenge oil pumping apparatus.

Another object of this invention is to provide an apparatus for pumping liquid from a sump in which the capacity of the pumping apparatus is automatically varied in accordance with changes in the level of the liquid in the sump.

Another object is to provide improved means for deaerating and for preventing aeration of the oil in an engine lubricating system.

Another object is to provide improved means for controlling the speed ratio of a variable speed pump drive.

A further object is to provide a control device for increasing or decreasing the capacity of a pump in response to a change in the character or condition of a fluid being pumped thereby.

Other objects and advantages will be apparent from the specification and claims and from the accompanying drawing which illustrates what is now considered to be the preferred embodiment of the invention.

In the drawings, Fig. 1 is a longitudinal cross-sectional view of an aircraft engine scavenge oil pumping apparatus constructed according to the teaching of the present invention.

Fig. 2 is a transverse cross-sectional view on a reduced scale along the line 2—2 in Fig. 1.

Fig. 3 is a view like Fig. 2 but taken along the line 3—3 in Fig. 1.

In aircraft engine lubricating systems drain oil usually flows by gravity to a sump and from there it is returned by a scavenge oil pump to the oil tank. Such pumps are made of excessively large capacity, in order to make sure that the drain oil does not exceed a safe level in the sump even under the most adverse operating conditions. Consequently, under most operating conditions, the sumps are kept practically dry and much air is pumped along with the drain oil and becomes mixed therewith, the resulting aeration of the oil is particularly disadvantageous in aircraft engine lubricating systems, and at high altitudes.

According to the present invention a pumping apparatus is provided which may be made large enough in capacity to prevent the liquid in a reservoir, such as an engine drain oil sump, from exceeding a safe level under any operating condition and which can be automatically adjusted to a lower capacity when the liquid level in the reservoir is reduced to a point where an appreciable amount of air is pumped or mixed with the oil. Further, the apparatus of this invention can also serve to deaerate any oil that may have become mixed with air.

In the embodiment of the invention illustrated in the drawing a scavenge pump is driven at a variable speed which is automatically regulated in accordance with changes in the level of the oil in the sump, or with changes in the relative amounts of liquid and gas supplied to the pump. The pump itself is of the gear type; its speed is controlled by a reaction device in the form of an auxiliary centrifugal pump which serves both as a control for regulating the speed of the main pump and as a deaerator for the oil passing therethrough.

Referring to the drawing, a variable speed drive 10, an auxiliary or control pump 12 and a main gear type pump 14 are all housed in a casing 16 comprising a body 18 and a cap 20. The body and cap are fastened together by bolts 22, which also retain the casing in fluid tight engagement with the walls (partially shown at 24) of an engine oil sump. The upper portion of casing 16 projects into the sump through a circular opening 26 in the bottom wall 24.

Drain oil from the engine (not shown) collects in the sump chamber C on the upper side of wall 24 at a rate which varies with changes in engine operating conditions, such as engine speed, altitude, etc. This drain oil flows by gravity into the casing 16 through an entrance opening 28 and is pumped first by the auxiliary pump 12 and then by the main gear pump 14 to a conduit 30 (Fig. 3) leading to the engine oil tank. The oil tank and other parts of the engine oil circulating system, such as the pressure pump and pressure oil distributing passages, have not been shown because they are of conventional design.

The main scavenge pump 14 comprises two gears 34, 36 fixed respectively to parallel shafts 38, 40 rotatably mounted at their lower ends in bearings in the cap 20 and at their upper ends in bearings in a housing or pump case 41. This housing is fastened to cap 20 by bolts 43 (Fig. 3). Rotation of shaft 40 causes both of the gears 34, 36 to rotate and to pump oil from the main pump inlet 44 to the outlet conduit 30, at a flow rate dependent upon the speed of rotation of gears 34, 36.

The main pump is driven through a variable speed drive 10 by a pump drive shaft 46 which is connected to the engine crankshaft by a gear train, not shown, so that it rotates in bearing 48 at a fixed speed relative to engine speed. A bevel gear 50 fixed to shaft 46 meshes with a bevel pinion 52 splined at 54 to a stub shaft 56. The stub shaft extends through the top of casing 16 and is supported by a ball bearing 58 in an opening in the top of the casing. It is integral with a cup or hub member 59, located within the top portion of the casing. A plate 60 is bolted at its outer periphery to the rim of the cup and the inner periphery of the plate carries a plurality of shafts 61 on which planet pinions 62 are rotatably mounted. These planet pinions mesh on the outside with a ring gear 64, formed on a flange integral with the top of the main pump drive shaft 40, and on the inside with a sun gear 66, keyed to drive shaft 68 of the control pump 12. Shafts 56, 40 and 68 are coaxial, with the upper end of the main pump drive shaft 40 journaled at 45 within the lower end of the stub shaft 56 and with the control pump drive shaft rotatably mounted at 72, 74 on the shaft 40. The variable speed drive 10 thus constitutes a planetary gear having a ring gear 64 for driving the main pump 14 and a sun gear 66 for driving the control pump 12. The ring and sun gears are both driven through the planet pinions 62 by cage 59, 60 and engine driven shaft 46.

The control pump is preferably of the centrifugal type, comprising a circular back plate 70 which has on its upper side a plurality of equally spaced radial vanes 71. Shaft 68 with which plate 70 is integral, is rotatably mounted by bearings 72, 74 on shaft 40. A guide plate 76 having a central opening 78 therein is pinned within the casing 16 at 80 so that it covers the upper portion of the vanes 71. The guide plate is spaced slightly from the vanes so as not to interfere with rotation thereof. However, the clearance is very small and the two plates 70, 76 and the vanes 71 cooperate to form radially extending passages which, when the vanes are rapidly rotated, pump oil centrifugally from the upper pump chamber 100 and the pump inlet 78 to the lower pump chamber 200. Oil thrown outwardly by the vanes 71 does not pass directly to the lower pump chamber 200 but first passes through a number of chambers formed by stator vanes 82 fixed to and equally spaced around the lower side of plate 76. Oil leaving the radial passages between vanes 71 flows first radially and then axially through the spaces between the stationary vanes 82 to the lower pump chamber 200. Air entrained with the oil tends to separate therefrom as a result of centrifugal action at the entrance portion of vanes 71. Further, air may collect in an annular groove or chamber 84, at the upper outer periphery of the stationary vanes, and such air passes back to the sump through the air bleed passages 86, 88. The exit opening of passage 88 is located considerably above the bottom of the opening 28 through which oil flows to the pumps. As the level of the oil in the sump C is normally maintained at or slightly above the bottom of the entrance opening 28 (or near the level represented by the top side of the backing plate 76) the top of the air bleed opening 88 is above the oil level and consequently air collecting in the annular chamber 84 is caused by the pressure difference between chamber 84 and the exit opening of bleed hole 88 to flow back into the sump. Some oil also flows through this bleed or vent but the apparatus may be so designed, if desired, that the amount of oil so by-passed is insignificant.

Oil flows from the stator vanes 82 into the main pump entrance chamber 200 under an initial pressure created by the centrifugal pump and then flows through the cylindrical strainer screen 202 into the gear pump inlet 44. Oil discharged from the gear pump, at relatively high pressure, is forced through the outlet conduit 30 back to the engine lubricating oil tank.

*Operation*

When the engine is started, the driving shaft 46 begins to rotate at a predetermined speed relative to engine speed. Assuming the sump C is dry, there will be little or no load on the centrifugal pump 70 and consequently shaft 68 and sun gear 66 will rotate relatively freely, thereby reducing the speed of the main gear pump 14 to the relatively low value.

As the sump begins to fill oil flows through the openings 28 and the centrifugal pump inlet 78 into the relatively rapidly revolving pump vanes 71. The resultant pumping action considerably increases the torque required to drive the control pump and thereby reduces the speed of the sun gear 66 and increases the speed of ring gear 64 and the main pump 14. Thus, when the fluid flowing through the control pump inlet 78 is all air the control pump rotates relatively fast and the main pump relatively slow. When the fluid flow through the inlet is all oil then the control pump rotates relatively slow and the main pump relatively fast. Under other conditions, when the inlet fluid is mixed liquid and gas or rapidly alternating liquid and gas, then the control pump and main pump will both be rotated at some intermediate speed, dependent on the relative amounts of liquid and gas flowing through the control pump inlet.

The planetary drive 10, control pump 12 and main pump 14 are preferably so designed that when the oil level in sump C is high (considerably above the level 79 of inlet opening 78) the main pump, which will then be operated at maximum speed, will have sufficient capacity to lower the level of the oil in the sump for any engine operating condition. In other words, the capacity of the pumping apparatus at maximum speed of pump 14 is greater than the maximum inflow of drain oil to sump C. Thus the quantity of oil in the sump can never exceed a predetermined safe limit. But when the quantity of oil in the sump decreases to a level near or below the plane of line 79 then a material quantity of air is admitted through inlet 78 along with the oil and the load on the control pump 12 is relieved, enabling sun gear 66 to rotate more rapidly and causing the ring gear 64 and the main pump 14 to be driven more slowly, thereby decreasing the speed and capacity of pump 14 and reducing the rate of oil flow through the pumping apparatus to a value commensurate with pumping requirements.

The automatic variation of pumping capacity with pumping requirements according to the present invention not only tends to eliminate aeration of the lubricating oil but also improves pump stability and efficiency, saves power and provides other advantages of particular importance in aircraft engine lubricating systems. While the vaned control device 12 is herein characterized as a centrifugal pump and deaeration means it is within the scope of the invention to utilize this device as control or braking device only, for regulating the speed of the sun gear or the speed ratio of the planetary gear drive without producing a pressure rise in the oil fed to the entrance chamber 200 of the main pump. For instance, the rotatable vanes 71 and/or the stator vanes 82 could be designed, in a manner known to the art, so that the control device 12 acts solely as a brake for the sun gear, of varying effectiveness in accordance with changes in the condition or character of the fluid flowing therethrough.

It is to be understood that the invention is not limited to the specific embodiment herein illustrated and described, but may be used in other ways without departure from its spirit as defined by the following claims.

I claim:

1. In an automatically variable speed pumping apparatus, an epicyclic gear train including a pair of gears which mesh with at least one planet gear, a pump driven by one of said gears, means for driving a second one of said gears, and a reaction device driven by the third gear for varying the speed of said pump in accordance with variations in the load on said reaction device.

2. Apparatus according to claim 1, including a chamber from which a liquid is evacuated by said pump, and means operative to vary the load on said reaction device in accordance with changes in the quantity of liquid in said chamber.

3. Apparatus according to claim 2, in which said reaction device comprises a vaned impeller having an inlet open to said chamber and an outlet open to the inlet of said pump.

4. Apparatus according to claim 3, including a row of stator vanes around said impeller, and a vent passage connected with the spaces between said stator vanes.

5. A variable speed drive for a scavenge oil pump comprising a transmission and means including a control pump for automatically regulating the speed ratio of the transmission, said transmission being of the planetary gear type and said control pump being driven by one of the gears of said transmission.

6. A variable speed drive for a scavenge oil pump comprising a transmission and means including a control pump for automatically regulating the speed ratio of the transmission, said transmission being of the planetary gear type, said control pump being driven by one of the gears of said transmission, and a scavenge pump being driven by another of the gears.

7. Means for preventing aeration of the liquid in a liquid circulating system comprising, a liquid container, a pump for withdrawing liquid therefrom, means responsive to variations in the level of the liquid in said container comprising a hydraulic brake device having an inlet located at a predetermined level in said container, and means controlled by said liquid responsive means for varying the rate of flow of liquid through said pump.

8. Means for preventing aeration of the liquid in a liquid circulating system comprising, a liquid container, a pump for withdrawing liquid therefrom, means responsive to variations in the level of the liquid in said container comprising a hydraulic brake device having an inlet located at a predetermined level in said container, said hydraulic brake device including a rotatable vaned member which receives liquid from said container through said inlet and which discharges said liquid to the inlet of said pump, and means controlled by said liquid responsive means for varying the rate of flow of liquid through said pump.

9. Means for preventing aeration of the liquid in a liquid circulating system comprising, a driving means, a liquid container, a main pump for withdrawing liquid from such container, a reaction device for varying the speed of said main pump in accordance with variations in the load on said device, a planetary gear transmission which includes a pair of gears which mesh with at least one planet gear, means driving said main pump by one of said gears, means driving another of said gears by said driving means, and means for driving said reaction device by said third gear.

ALBERT M. ROCKWELL.

REFERENCES CITED

The following references are of record in the file of this patent:

UNITED STATES PATENTS

| Number | Name | Date |
|---|---|---|
| 1,908,614 | Maloon | May 9, 1933 |
| 2,092,092 | Sinclair | Sept. 7, 1937 |
| 2,340,975 | Morgan | Feb. 8, 1944 |
| 2,416,193 | Meyers | Feb. 18, 1947 |

FOREIGN PATENTS

| Number | Country | Date |
|---|---|---|
| 251,237 | Great Britain | 1926 |